US011106660B2

(12) United States Patent
Li et al.

(10) Patent No.: US 11,106,660 B2
(45) Date of Patent: Aug. 31, 2021

(54) SERVICE IDENTIFIER-BASED DATA INDEXING

(71) Applicant: Advanced New Technologies Co., Ltd., Grand Cayman (KY)

(72) Inventors: Yize Li, Hangzhou (CN); Xinying Yang, Hangzhou (CN); Yuan Zhang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/215,255

(22) Filed: Mar. 29, 2021

(65) Prior Publication Data

US 2021/0216534 A1 Jul. 15, 2021

Related U.S. Application Data

(63) Continuation of application No. 16/811,502, filed on Mar. 6, 2020, now Pat. No. 10,963,453, which is a (Continued)

(30) Foreign Application Priority Data

Jun. 3, 2019 (CN) .......................... 201910475975.2

(51) Int. Cl.
*G06F 16/245* (2019.01)
*G06F 16/23* (2019.01)
(Continued)

(52) U.S. Cl.
CPC .......... *G06F 16/2379* (2019.01); *G06F 16/22* (2019.01); *G06F 16/2365* (2019.01); *G06F 16/245* (2019.01); *G06F 16/27* (2019.01)

(58) Field of Classification Search
CPC ......... G06F 16/22; G06F 16/245; G06F 16/27
See application file for complete search history.

(56) References Cited

U.S. PATENT DOCUMENTS 10,963,453 B2   3/2021  Li et al.
2018/0089041 A1* 3/2018 Smith ................. G06F 16/2255
(Continued)

FOREIGN PATENT DOCUMENTS

CN   103150397   6/2013
CN   107239479   10/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic. Cash System," www.bitcoin.org, 2005, 9 pages.
PCT International Search Report and Written Opinion in International Appln. No. PCT/CN2020/071461, dated Mar. 26, 2020, 19 pages (with partial English translation).
(Continued)

*Primary Examiner* — Grace Park
(74) *Attorney, Agent, or Firm* — Fish & Richardson P.C.

(57) ABSTRACT

Implementations of this specification provide service identifier-based data indexing. An example method performed by a data indexing apparatus of a centralized database service provider that stores data by using a blockchain-type ledger includes obtaining a service identifier and a service label of a data record, the service identifier uniquely identifying a service attribute of the data record, and the service label representing a type of the data record; determining location information of the data record in the blockchain-type ledger, the location information including a block height of a data block that includes the data record, and a positional offset of the data record in the data block that includes the data record; establishing a mapping relationship among the service identifier, the service label, and the location information; and writing the mapping relationship into an index for which a primary key is the service identifier.

19 Claims, 5 Drawing Sheets

Related U.S. Application Data continuation of application No. PCT/CN2020/071461, filed on Jan. 10, 2020.

(51) Int. Cl.
　　*G06F 16/22* 　　　(2019.01)
　　*G06F 16/27* 　　　(2019.01)

(56) References Cited

U.S. PATENT DOCUMENTS

| | | |
|---|---|---|
| 2018/0268504 A1 | 9/2018 | Paolini-Subramanya et al. |
| 2019/0253258 A1* | 8/2019 | Thekadath ............ H04L 9/0637 |
| 2020/0005292 A1* | 1/2020 | Mao .................... H04L 9/3247 |
| 2020/0210410 A1 | 7/2020 | Li et al. |

FOREIGN PATENT DOCUMENTS

| | | |
|---|---|---|
| CN | 107273556 | 10/2017 |
| CN | 107729383 | 2/2018 |
| CN | 107943951 | 4/2018 |
| CN | 108197505 | 6/2018 |
| CN | 109508564 | 3/2019 |
| CN | 109558422 | 4/2019 |
| CN | 109669943 | 4/2019 |
| CN | 110347674 | 10/2019 |
| WO | WO 2018085558 | 5/2018 |

\* cited by examiner

SERVICE IDENTIFIER-BASED DATA INDEXING

CROSS-REFERENCE TO RELATED APPLICATIONS

This application is a continuation of U.S. patent application Ser. No. 16/811,502, filed Mar. 6, 2020, which is a continuation of PCT Application No. PCT/CN2020/071461, filed on Jan. 10, 2020, which claims priority to Chinese Patent Application No. 201910475975.2, filed on Jun. 3, 2019, and each application is hereby incorporated by reference in its entirety.

TECHNICAL FIELD

Implementations of the present specification relate to the field of information technologies, and in particular, to service identifier-based data indexing methods, apparatuses, and devices.

BACKGROUND

When a centralized database service provider provides services by using a blockchain-type ledger, that stores data based on a blockchain data structure (e.g., in a form of a blockchain), the ledger records related data records to be stored by related users.

In practice, the centralized database service provider is usually connected to enterprise users, and data records to be stored by the enterprise users usually have different service identifiers (which can be considered as service attributes), such as sources of the data records, users of the data records, and projects to which the data records belong. The same service identifier may correspond to different types of data records. For example, in a source tracing process, when the same batch of products is transported at different transport points, the different transport points have transport records of the products, and the different transport points have different transport urgency levels for the products and may have multiple different sending urgency levels.

Data records with the same service identifier are usually stored in a blockchain-type ledger in a distributed way, and multiple different types of data records are usually included for the same service identifier. However, current querying in a blockchain-type ledger is usually in a serial manner. On this basis, a service identifier-based data indexing solution is needed.

SUMMARY

An objective of implementations of the present application is to provide service identifier-based data indexing methods in a blockchain-type ledger and more flexible data record query solutions.

To alleviate the previously described technical problem, the implementations of the present application are implemented as follows:

An implementation of the present specification provides a service identifier-based data indexing method, where the method is applied to a centralized database service provider that stores data by using a blockchain-type ledger, and the method includes: obtaining a service identifier and a service label of a data record, where the service identifier is used to uniquely identify a service attribute of the data record, and the service label is used to represent a type of the data record; determining location information of the data record in the ledger, where the location information includes a block height of a data block including the data record, and a positional offset of the data record in the data block including the data record; and establishing a mapping relationship among the service identifier, the service label, and the location information, and writing the mapping relationship into an index for which a primary key is the service identifier, where each data block except an initial data block in the blockchain-type ledger includes at least one data record, each data block includes a hash value of the data block that is determined based on a hash value of a previous data block and hash values of data records included in the data block, and a block height of the data block monotonically increases as more data blocks are generated over time.

Correspondingly, an implementation of the present specification further provides a service identifier-based data indexing apparatus, where the apparatus is applied to a centralized database service provider that stores data by using a blockchain-type ledger, and the apparatus includes: an acquisition module, configured to obtain a service identifier and a service label of a data record, where the service identifier is used to uniquely identify a service attribute of the data record, and the service label is used to represent a type of the data record; a determining module, configured to determine location information of the data record in the ledger, where the location information includes a block height of a data block including the data record, and a positional offset of the data record in the data block including the data record; and a writing module, configured to establish a mapping relationship among the service identifier, the service label, and the location information, and write the mapping relationship into an index for which a primary key is the service identifier, where each data block except an initial data block in the blockchain-type ledger includes at least one data record, each data block includes a hash value of the data block that is determined based on a hash value of a previous data block and hash values of data records included in the data block, and a block height of the data block monotonically increases as more data blocks are generated over time.

According to another aspect, an implementation of the present specification further provides a data record query method based on the previously described index, where the method is applied to a centralized database service provider that stores data by using a blockchain-type ledger, and the method includes: receiving a query that includes a service identifier and a service label and that is sent by a client; performing matching within a pre-created index table based on the service identifier and the service label, to determine location information corresponding to the service identifier and the service label in the index table; and obtaining a corresponding data record from the ledger based on the location information, and returning the obtained corresponding data record to the client.

Corresponding to the another aspect, an implementation of the present specification further provides a data record query apparatus, where the apparatus is applied to a centralized database service provider that stores data by using a blockchain-type ledger, and the apparatus includes: a receiving module, configured to receive a query that includes a service identifier and a service label and that is sent by a client; a matching module, configured to perform matching within a pre-created index table based on the service identifier and the service label, to determine location information corresponding to the service identifier and the service label in the index table; and an acquisition module, configured to obtain a corresponding data record from the ledger based on the location information, and return the obtained corresponding data record to the client.

According to the solutions provided in the implementations of the present specification, during data storage, an index related to a service identifier, a service label, and location information is created based on an agreement of both service parties. Therefore, during data querying, the location information of a corresponding data record can be obtained based on the service identifier and the service label, and then the corresponding data record can be obtained, so that a query process is more flexible, thereby improving user experience.

It is worthwhile to understand that the previous general description and the following detailed description are merely examples and explanation, and cannot limit the implementations of the present specification.

In addition, any of the implementations of the present specification does not need to achieve all the previously described effects.

BRIEF DESCRIPTION OF DRAWINGS

To describe the technical solutions in the implementations of the present specification or in the existing technology more clearly, the following briefly describes the accompanying drawings required for describing the implementations or the existing technology. Clearly, the accompanying drawings in the following description merely show some implementations recorded in the implementations of the present specification, and a person of ordinary skill in the art can still derive other drawings from these accompanying drawings.

DESCRIPTION OF IMPLEMENTATIONS

To make a person skilled in the art understand the technical solutions in the implementations of the present specification better, the following describes the technical solutions in the implementations of the present specification in detail with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope.

Figure 2:
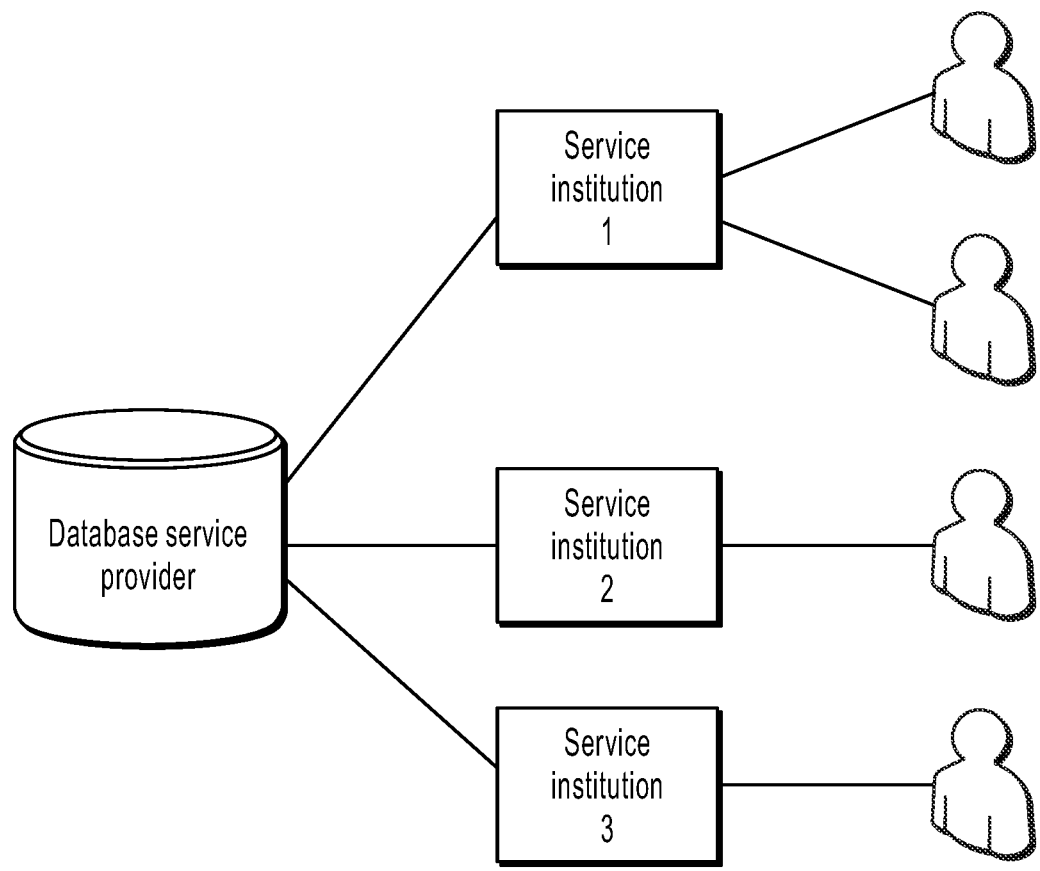
FIG. 2 is a schematic diagram illustrating a system architecture, according to an implementation of the present specification.

First, a centralized blockchain-type ledger involved in the implementations of the present specification is described. In practice, a database service provider is usually oriented to various institutions, and the institutions can store data records generated between the institutions and third-party users (including other institutions or individuals) in the database service provider. FIG. 2 is a schematic diagram illustrating a system architecture, according to an implementation of the present specification. In the schematic diagram, one enterprise institution can be oriented to multiple users, and each user can query a database service provider by using an enterprise institution corresponding to the user.

For example, an institution connected to the database service provider is a certain financial product company, and a data record can be a financial management record of an individual user in the financial product company; or an institution connected to the database service provider can be a government department, and a data record is an overhead detail of the government department for a public project managed by the department; or an institution connected to the database service provider is a certain hospital, and a data record is a medical record of a patient; or an institution connected to the database service provider is a third-party payment institution, and a data record can be a payment record of an individual user generated by using the institution.

Figure 1:
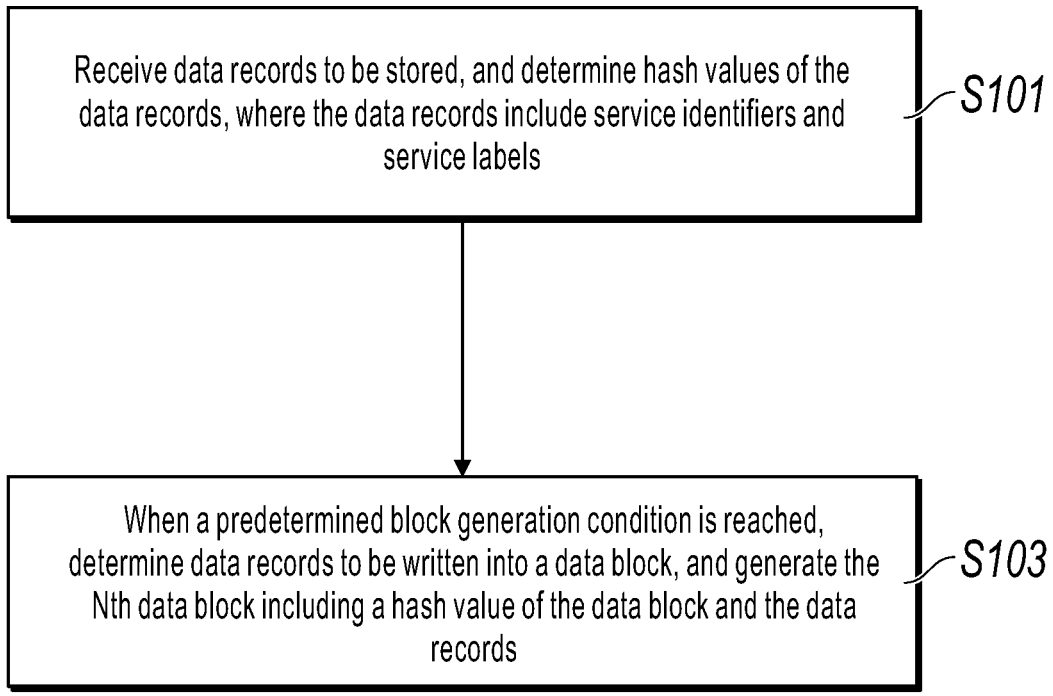
FIG. 1 is a schematic diagram illustrating a process of generating a blockchain-type ledger, according to an implementation of the present specification.

For the centralized database service provider, the blockchain-type ledger is generated in the following way. FIG. 1 is a schematic diagram illustrating a process of generating a blockchain-type ledger, according to an implementation of the present specification. The process includes the following steps.

S101. Receive data records to be stored, and determine hash values of the data records, where the data records include service identifiers and service labels.

The data records to be stored here can be various consumption records of a client individual user, or can be a service result, an intermediate status, an operation record, etc. generated when an application server executes service logic based on a user instruction. A specific service scenario can include a consumption record, an audit log, a supply chain, a government supervision record, a medical record, etc.

As previously described, data records have different content based on different service scenarios. In this implementation of the present specification, a service identifier is used to uniquely identify a service attribute of a data record.

For example, when a data record is a medical record, a service identifier can be a user identifier (including a mobile phone number, an identity card number, a user name, etc.) of a patient, or a hash value obtained by performing a hash algorithm on the user identifier; or when a data record is a project overhead of a certain institution (data records of multiple projects of one institution may be stored in the same ledger), a service identifier in this case can be a unique project number.

A service label is used to further classify a data record and is used to represent a type of the data record, and the service label is different from the service identifier in granularity.

For example, a medical record can include a service label such as "serious illness" or "ailment" and a similar label such as "emergency" or "non-emergency", so that classification of medical records of the same user can be more detailed.

For another example, for a project overhead record, a service label such as "large amount" or "small amount" can be added to each expenditure, so that data records with the same service identifier can be classified at a finer granularity based on amounts.

In summary, in the same service scenario, a service identifier can clearly indicate a unique corresponding party of a data record, and a service label can be used to classify data records with the same service identifier at a finer granularity.

One data record includes only one service identifier, but can include multiple labels. For example, for a medical record of a user, an identity card of the user can be used as a service identifier, and the medical record of the user includes both service labels "ailment" and "emergency".

S103. When a predetermined block generation condition is reached, determine data records to be written into a data block, and generate the Nth data block including a hash value of the data block and the data records.

The predetermined block generation condition includes: a quantity of data records to be stored reaches a quantity threshold. For example, a new data block is generated each time one thousand data records are received, and the one thousand data records are written into the block. Alternatively, the predetermined block generation condition includes: a time interval from the last block generation time reaches a time threshold. For example, a new data block is generated every five minutes, and data records received in the five minutes are written into the block.

N here is a sequence number of the data block. In other words, in this implementation of the present specification, data blocks are arranged in a blockchain form as more data blocks are generated over time, and have a strong time sequence feature. A block height of the data block monotonously increases based on the sequence of the block generation times. The block height can be a sequence number, and in this case, a block height of the Nth data block is N. Alternatively, the block height can be generated by using other methods.

When N=1, the data block in this case is an initial data block. A hash value and a block height of the initial data block are given based on a predetermined way. For example, if the initial data block includes no data record, the hash value is any given hash value, and the block height blk-num=0. For another example, a trigger condition for generating the initial data block is consistent with a trigger condition for generating another data block, but the hash value of the initial data block is determined by performing hashing on all content in the initial data block.

When N>1, because content and a hash value of a previous data block have been determined, in this case, a hash value of the current data block (the Nth data block) can be generated based on the hash value of the previous data block (that is, the (N−1)th data block). For example, in a feasible way, a hash value of each data record to be written into the Nth data block is determined, a Merkel tree is generated based on a sequence of the data records in the block, a root hash value of the Merkel tree is concatenated with the hash value of the previous data block, and the hash value of the current data block is generated by using a hash algorithm again. For another example, concatenation and hashing can be performed based on a sequence of the data records in the block to obtain an overall hash value of the data records, the hash value of the previous data block can be concatenated with the overall hash value of the data records, and a hash operation is performed on a string obtained after the concatenation, to generate the hash value of the data block.

After successfully uploading data, a user can obtain and store a hash value of a corresponding data record and a hash value of a data block including the corresponding data record, and can initiate integrity verification based on the hash value. A specific verification method is recalculating a hash value of the data record and a hash value of the data block including the data record in a database, and then comparing the hash value of the data record and the hash value of the data block including the data record with the locally stored hash values.

According to the previously described data block generation method, each data block is determined based on a hash value, and the hash value of the data block is determined based on content and a sequence of data records in the data block and a hash value of a previous data block. A user can initiate verification at any time based on a hash value of a data block. Modification to any content in the data block (including modification to content or a sequence of data records in the data block) results in inconsistency between a hash value of the data block obtained through calculation during verification and a hash value obtained during data block generation, causing a verification failure. Therefore, tamper-resistance under centralization is implemented.

During verification in the blockchain-type ledger, generally, continuous integrity verification is performed on a specified segment of data blocks, or continuous integrity verification is performed starting from an initial data block. A verification method is obtaining a hash value of a previous data block, recalculating a hash value of a data block based on data records in the data block and the hash value of the previous data block by using the same algorithm for generating a hash value of the data block, and comparing the hash value of the data block with the previously stored hash value to verify consistency.

As previously described, these data records usually have a relatively strong time sequence feature (that is, a data record written first is usually ranked first) when being written into the ledger. However, for a user, data records of the user are usually stored in multiple data blocks in a distributed way. For example, a hospital uploads medical records of all patients in a sequence of generation times. However, a certain user of the hospital may have multiple medical records and a time interval is relatively large, which is very inconvenient for the hospital or the user to select the data records of the user from the ledger or even find some specific medical records from the ledger.

For example, the hospital or the user needs "serious illness" records of the user. In this case, the data records of the user need to be obtained through querying by traversing the ledger based on hash values stored by the user, and further the "serious illness" records need to be obtained by querying the data records.

Figure 3:
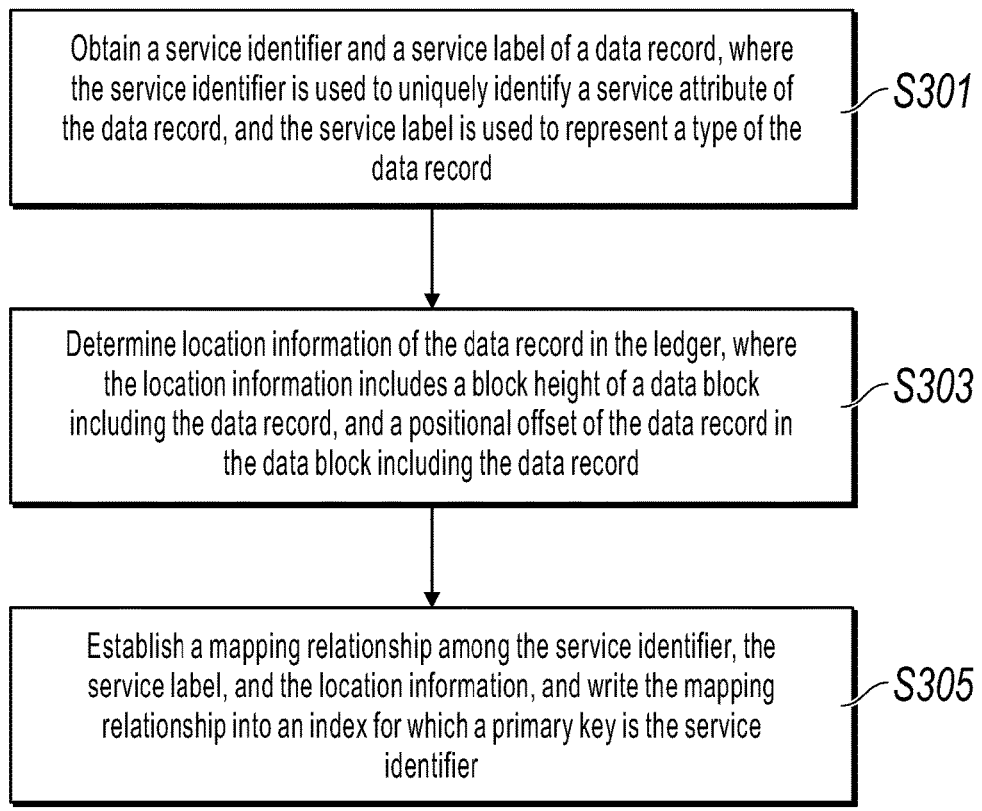
FIG. 3 is a schematic flowchart illustrating a service identifier-based data indexing method, according to an implementation of the present specification.

On this basis, an implementation of the present specification provides a service identifier-based data indexing method, where the method is applied to a centralized database service provider that stores data by using a blockchain-type ledger. In the method, a related index can be created without necessarily knowing details of a service of a connected institution, to facilitate processing of the service of the connected institution and improving user experience. FIG. 3 is a schematic flowchart illustrating a service identifier-based data indexing method, according to an implementation of the present specification. The process specifically includes the following steps:

S301. Obtain a service identifier and a service label of a data record, where the service identifier is used to uniquely identify a service attribute of the data record, and the service label is used to represent a type of the data record.

Specific locations and acquisition methods of the service identifier and the service label of the data record can be predetermined by a database service provider and a connected institution through negotiation. For example, when the data record provided by the connected institution is a standard structured data record, the service identifier and the service label can be obtained from a specified positional offset in the data record, or start locations and end locations of the service identifier and the service label can be determined by using specific characters. For example, "OE" is used as a start character of the service identifier/service label, and "OF" is used as an end character of the service identifier/service label. Alternatively, when the data record provided by the connected institution is unstructured data, the connected institution can directly concatenate a header including a service identifier and a service label at the beginning of each data record when the connected institution uploads the data record, and the database service provider can directly obtain the service identifier and the service label of each data record from the header.

S303. Determine location information of the data record in the ledger, where the location information includes a block height of a data block including the data record, and a positional offset of the data record in the data block including the data record.

As previously described, one blockchain-type ledger includes multiple data blocks, and one data block usually includes multiple data records. Therefore, in this implementation of the present specification, the location information is specifically a data block storing a data record in the ledger and a positional offset or an arrangement sequence number of the data record in the data block.

For the data block provided in this implementation of the present specification, different data blocks can be identified by using multiple methods, including hash values or block heights of the data blocks.

A hash value of a data block is a hash value obtained by performing a hash calculation based on a hash value of a previous block and data records in the data block, and can be used to uniquely and clearly identify the data block. In the blockchain-type ledger, generally, a block height of the first data block is 0, and subsequently a block height is increased by 1 each time a data block is added. Alternatively, respective timestamps of generation of data blocks can be converted into a large monotonically increasing integer sequence (generally having 12 to 15 bits) to be used as a block height of the data block. Therefore, a data block usually has a specified block height.

In addition, in a determined data block to be written into a database, a sequence of data records in the data block is fixed. Therefore, a sequence number of a data record in the data block is also specified. When a length of the data record is a fixed unit, the sequence number can also be used to determine location information of the data record in the data block including the data record. In other words, a positional offset of a data record in a data block can be represented by using an address positional offset or a sequence number.

Because one data block usually includes multiple data records, the data records in the data block can be separately identified by using address positional offsets of the data records in the data block. Clearly, address positional offsets of data records in the same data block are different.

Therefore, a form of location information of a data record can be represented by using the following array: (block height, sequence number), for example, (2, 10), where 2 represents a height of a data block, and 10 represents a sequence number of the data record in the data block. Alternatively, content in an array is (block height, positional offset), for example, (2, 1024), where 2 represents a block height of a data block, and 1024 represents a positional offset of the data record in a block body of the data block.

Certainly, in the method provided in this implementation of the present specification, a specific format of the data block can be customized (for example, forms of metadata information and comment information that are included in a block header of the data block and a form of a block height of the data block can be customized). Therefore, location information has different content in different formats. It does not constitute a limitation to the present solution.

S305. Establish a mapping relationship among the service identifier, the service label, and the location information, and write the mapping relationship into an index for which a primary key is the service identifier.

That is, the index is an inverted index. In the index, the primary key is the service identifier included in the data record. A specific writing method is creating an index record for which a primary key is the service identifier in an index table when the primary key of the index does not include the service identifier; or writing the service label and the location information in an index record including the service identifier when the primary key of the index includes the service identifier. It is worthwhile to note that the writing here is not overlay writing, but is adding the location information to a value of the index record, where the location information exists in the index record in parallel with other location information.

Table 1 is an example index table, according to an implementation of the present specification. In Table 1, a key is a specific value of a service identifier, each array in a value part is service label+location information, and a format of an array element is (service label, location information), for example, (1, 2, 08), where 1 is a service label, 2 in (2, 08) is a height of a block, and 08 in (2, 08) is a sequence number of a data record in the data block. A data record can be uniquely determined based on a block height and a sequence number. It is easy to understand that in the index table, one key can correspond to multiple pieces of location information.

TABLE 1

| Key | Value |
|---|---|
| 0X123456 | (1, 2, 08), (1, 2, 10), (2, 300, 89), (2, 300, 999) |
| 344X0001 | (1, 5, 01), (2, 8, 22) |
| ... | ... |

According to the solution provided in this implementation of the present specification, for a data record written into the ledger, a service identifier and a service label of the data record and a storage location of the data record in the ledger are determined, a corresponding mapping relationship is established, and an inverted index for which a primary key is the service identifier is created. Therefore, without necessarily knowing details of a service of a user, corresponding statistics collection can be performed for the data record based on the service identifier in the index, and querying can be performed at a finer granularity based on the service label, to facilitate subsequent querying and verification.

In an implementation, when the database service provider obtains the service identifier and the service label of the data record, an obtaining method can be synchronous creation, that is, the data record is directly parsed to obtain the service identifier and the service label when the data record is received, and an index is created synchronously when the data block is written into the ledger. In another method, an index does not need to be created immediately when the data block is written into the ledger. Instead, when the database has a vacant resource, an index is created asynchronously for each data record in the data block newly written into the ledger. The asynchronous creation method helps the database service provider save resources.

In the index table, because one service identifier can correspond to multiple pieces of location information+service labels (that is, correspond to multiple data records), when these pieces of location information are written into an index, these pieces of location information can be arranged based on a sequence of the data records in the ledger, to facilitate querying and verification performed by a user. The sequence of the data records in the ledger can be embodied by using timestamps at which the data records are written into the ledger (that is, data block generation timestamps), and data records in the same data block can be embodied by using a sequence of the data records in the data block.

According to the solution provided in this implementation of the present specification, for a data record written into the ledger, a service attribute of the data record and a storage location of the data record in the ledger are determined, a mapping relationship between the service attribute and the storage location is established, and an inverted index for which a primary key is the service attribute is created. Therefore, without necessarily knowing details of a service of a user, corresponding statistics collection can be performed for the data record based on the service attribute in the index, to facilitate subsequent querying and verification.

Figure 4:
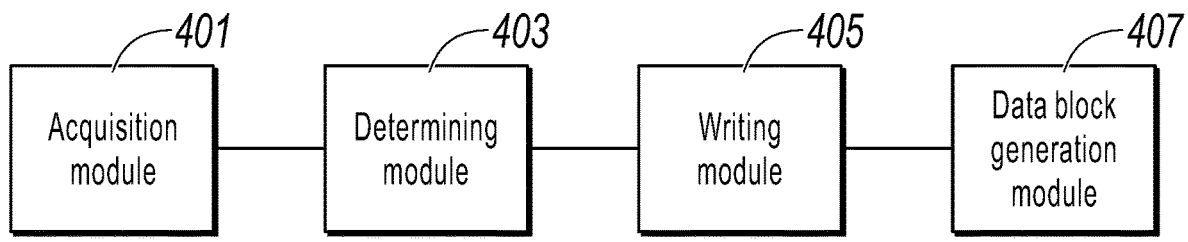
FIG. 4 shows a service identifier-based data indexing apparatus, according to an implementation of the present specification.

Correspondingly, as shown in FIG. 4, an implementation of the present specification further provides a service identifier-based data indexing apparatus, where the apparatus is applied to a centralized database service provider that stores data by using a blockchain-type ledger. FIG. 4 shows a service identifier-based data indexing apparatus, according to an implementation of the present specification. The apparatus includes: acquisition module 401, configured to obtain a service identifier and a service label of a data record, where the service identifier is used to uniquely identify a service attribute of the data record, and the service label is used to represent a type of the data record; determining module 403, configured to determine location information of the data record in the ledger, where the location information includes a block height of a data block including the data record, and a positional offset of the data record in the data block including the data record; and writing module 405, configured to establish a mapping relationship among the service identifier, the service label, and the location information, and write the mapping relationship into an index for which a primary key is the service identifier, where each data block except an initial data block in the blockchain-type ledger includes at least one data record, each data block includes a hash value of the data block that is determined based on a hash value of a previous data block and hash values of data records included in the data block, and a block height of the data block monotonically increases as more data blocks are generated over time.

Further, acquisition module 401 is configured to: when receiving a data record sent by a user, obtain a service identifier and a service label from the data record; or determine data records included in a data block in the ledger, and obtain a service identifier and a service label of any data record included in the data block.

Further, writing module 405 is configured to create an index record for which a primary key is the service identifier in an index table when the primary key of the index does not include the service identifier; or write the location information into an index record including the service identifier when the primary key of the index includes the service identifier.

Further, writing module 405 is configured to determine timestamps of data records; and write location information of the data records into a value of the same index record based on a sequence of the timestamps.

Further, the apparatus includes data block generation module 407, configured to receive data records to be stored, and determine hash values of the data records, where the data records include service identifiers and service labels; and when a predetermined block generation condition is reached, determine data records to be written into a data block, and generate the Nth data block including a hash value of the data block and the data records, which specifically includes: when N=1, a hash value and a block height of an initial data block are given based on a predetermined way; or when N>1, a hash value of the Nth data block is determined based on the data records to be written into the data block and a hash value of the (N−1)th data block, and the Nth data block including the hash value of the Nth data block and the data records is generated, where a block height of the data block monotonically increases as more data blocks are generated over time.

Figure 5:
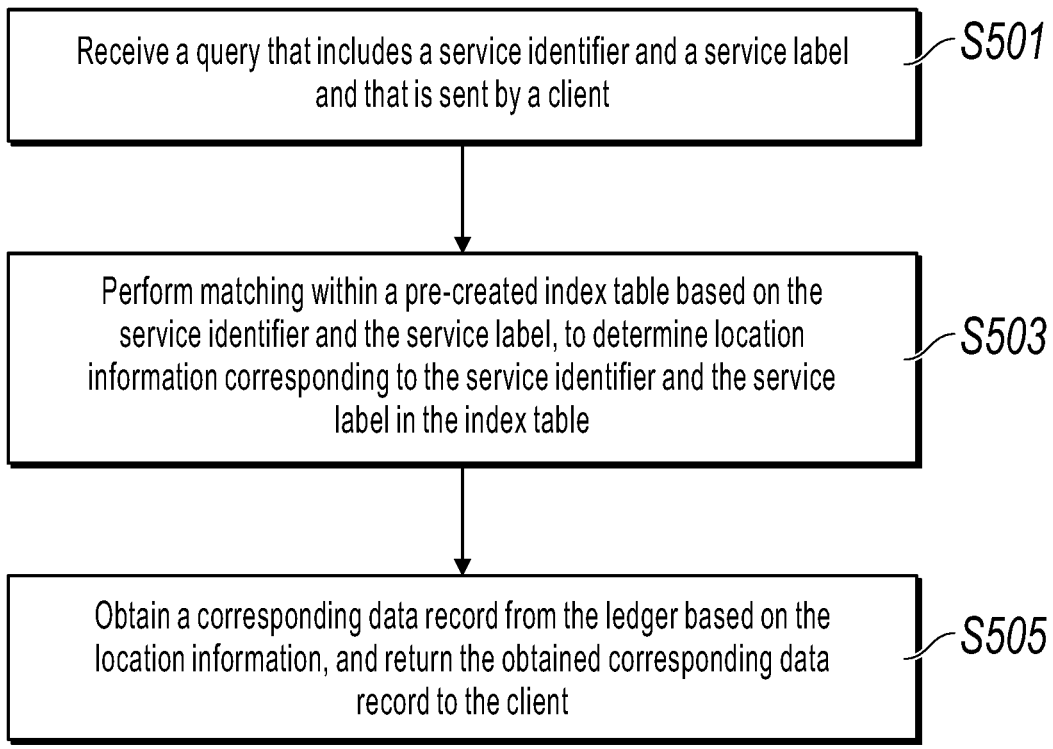
FIG. 5 is a schematic flowchart illustrating a data record query method, according to an implementation of the present specification.

According to another aspect, as shown in FIG. 5, an implementation of the present specification further provides a data record query method based on the previously described index, where the method is applied to a centralized database service provider that stores data by using a blockchain-type ledger. FIG. 5 is a schematic flowchart illustrating a data record query method, according to an implementation of the present specification. The method includes the following steps.

S501. Receive a query that includes a service identifier and a service label and that is sent by a client.

Assume that a service identifier "0X123456" is an identity ID of a user. It is easy to understand that the user is more concerned about a data record and a data block that are related to the service identifier, and is not concerned about other data blocks.

In this case, a query can be from a connected institution or a user served by the connected institution. For example, a form of a query instruction entered by the user can be Retrieve (0X123456, 1, FULL), where "0X123456" is a service identifier and 1 is a service label, and the query instruction is used to obtain, through querying, a data record of type "1" generated based on the service identifier "0X123456" in the ledger.

Further, during querying, a block height parameter used to specify a data block interval can be further included. For example, the user enters a query instruction: Retrieve (0X123456, 1, 100), to query a data record of type "1" that exists before a block height 100 and corresponds to a specified service identifier "0X123456".

In addition, a segment of data blocks can be determined based on two data block heights. For example, the user enters a query instruction: Retrieve (0X123456, 2, 200, 1000), to query a data record of type "2" that exists between a block height 200 and a block height 1000 in the ledger and corresponds to a specified service identifier "0X123456", to obtain data records corresponding to location information (300, 89) and (300, 999).

S503. Perform matching within a pre-created index table based on the service identifier and the service label, to determine location information corresponding to the service identifier and the service label in the index table.

Specifically, all VALUEs corresponding to a corresponding primary key are first obtained through querying based on the service identifier, and then location information corresponding to the service label entered by the user is obtained from the VALUEs through matching.

For example, after index table 1 is created, if a user enters a query instruction: Retrieve (0X123456, 1, FULL), location information (2, 08) and (2, 10) can be obtained. That is, the eighth and the tenth data records in the second data block can be obtained.

If a query instruction entered by a user is Retrieve (0X123456, 2, 200, 1000), location information (300, 89) and (300, 999) can be obtained in this case. That is, the 89th and the 999th data records in the 300th data block can be obtained.

S505. Obtain a corresponding data record from the ledger based on the location information, and return the obtained corresponding data record to the client.

According to the solution provided in this implementation of the present specification, the service identifier and the service label are added to the query instruction. Therefore, during querying, the user does not need to obtain all data and then perform traversal classification each time, and can accurately perform querying for related data at a finer granularity, thereby improving query efficiency.

Figure 6:
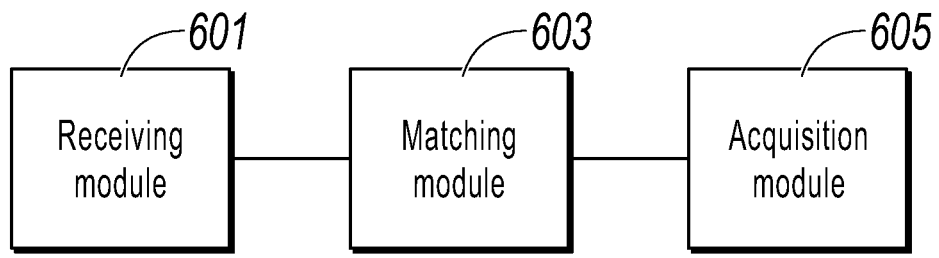
FIG. 6 is a schematic structural diagram illustrating a data record query apparatus, according to an implementation of the present specification.

Corresponding to the another aspect, as shown in FIG. 6, an implementation of the present specification further provides a data record query apparatus, where the apparatus is applied to a centralized database service provider that stores data by using a blockchain-type ledger. FIG. 6 is a schematic structural diagram illustrating a data record query apparatus, according to an implementation of the present specification. The apparatus includes: receiving module 601, configured to receive a query that includes a service identifier and a service label and that is sent by a client; matching module 603, configured to perform matching within a pre-created index table based on the service identifier and the service label, to determine location information corresponding to the service identifier and the service label in the index table; and acquisition module 605, configured to obtain a corresponding data record from the ledger based on the location information, and return the obtained corresponding data record to the client.

An implementation of the present specification further provides a computer device. The computer device includes at least a memory, a processor, and a computer program that is stored in the memory and that can run on the processor. The processor implements the data indexing method shown in FIG. 3 when executing the program.

An implementation of the present specification further provides a computer device. The computer device includes at least a memory, a processor, and a computer program that is stored in the memory and that can run on the processor. The processor implements the data record query method shown in FIG. 5 when executing the program.

Figure 7:
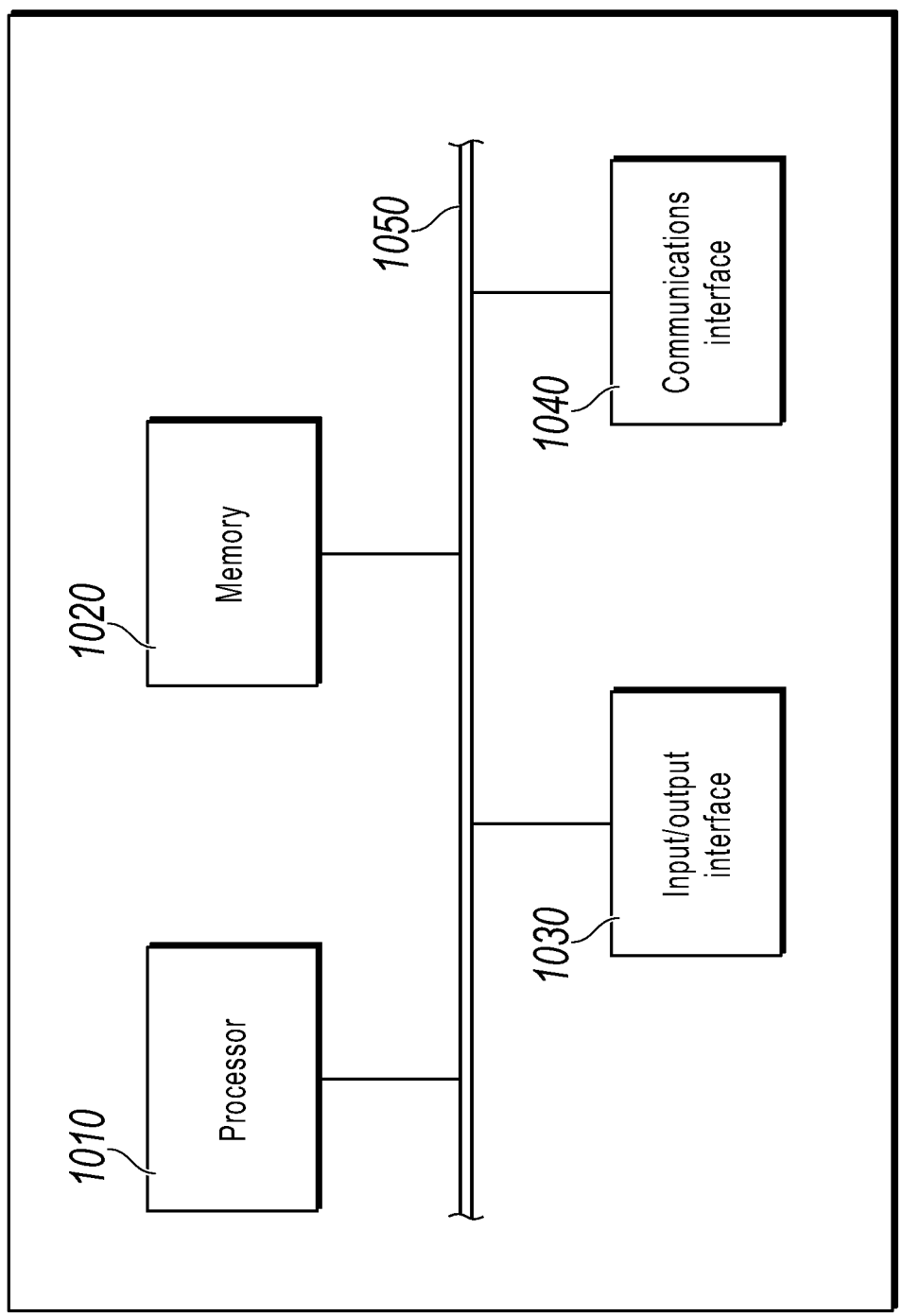
FIG. 7 is a schematic structural diagram illustrating a device for configuring the method in the implementations of the present specification.

FIG. 7 is a more detailed schematic diagram illustrating a hardware structure of a computing device, according to an implementation of the present specification. The device can include processor 1010, memory 1020, input/output interface 1030, communications interface 1040, and bus 1050. Processor 1010, memory 1020, input/output interface 1030, and communications interface 1040 are communicatively connected to each other inside the device by using bus 1050.

Processor 1010 can be implemented by using a general central processing unit (CPU), a microprocessor, an application-specific integrated circuit (ASIC), one or more integrated circuits, etc., and is configured to execute a related program, to implement the technical solutions provided in the implementations of the present specification.

Memory 1020 can be implemented by using a read-only memory (ROM), a random access memory (RAM), a static storage device, a dynamic storage device, etc. Memory 1020 can store an operating system and other application programs. When the technical solutions provided in the implementations of the present specification are implemented by using software or firmware, related program code is stored in memory 1020, and is invoked and executed by processor 1010.

Input/output interface 1030 is configured to be connected to an input/output module, to input or output information. The input/output module (not shown in the figure) can be configured in the device as a component, or can be externally connected to the device, to provide a corresponding function. The input module can include a keyboard, a mouse, a touchscreen, a microphone, various sensors, etc. The output module can include a monitor, a speaker, an oscillator, an indicator, etc.

Communications interface 1040 is configured to be connected to a communications module (not shown in the figure), to implement communication interaction between the device and another device. The communications module can perform communication in a wired way (for example, by using USB or a network cable), or can perform communication in a wireless way (for example, by using a mobile network, Wi-Fi, or Bluetooth).

Bus 1050 includes a channel for transmitting information between components (for example, processor 1010, memory 1020, input/output interface 1030, and communications interface 1040) of the device.

It is worthwhile to note that although only processor 1010, memory 1020, input/output interface 1030, communications interface 1040, and bus 1050 of the device are shown, in a specific implementation process, the device can further include other components required for normal running. In addition, a person skilled in the art can understand that the device can include only components necessary for implementing the solutions in the implementations of the present specification, but does not necessarily include all the components shown in the figure.

An implementation of the present specification further provides a computer readable storage medium. The computer readable storage medium stores a computer program, and the data indexing method shown in FIG. 3 is implemented when the program is executed by a processor.

An implementation of the present specification further provides a computer readable storage medium. The computer readable storage medium stores a computer program, and the data record query method shown in FIG. 5 is implemented when the program is executed by a processor.

The computer readable medium includes persistent, non-persistent, movable, and unmovable media that can store information by using any method or technology. The information can be a computer readable instruction, a data structure, a program module, or other data. Examples of the computer storage medium include but are not limited to a phase-change RAM (PRAM), a static RAM (SRAM), a dynamic RAM (DRAM), a RAM of another type, a ROM, an electrically erasable programmable read only memory (EEPROM), a flash memory or another memory technology, a compact disc read-only memory (CD-ROM), a digital versatile disc (DVD) or another optical storage, a cassette, a cassette magnetic disk storage, or another magnetic storage device, or any other non-transmission medium. The computer storage medium can be configured to store information that can be accessed by a computing device. As defined in the present specification, the computer readable medium does not include computer readable transitory media such as a modulated data signal and a carrier.

It can be known from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be specifically implemented by using a computer chip or an entity, or can be implemented by using a product having a certain function. A typical implementation device is a computer, and a specific form of the computer can be a personal computer, a laptop computer, a cellular phone, a camera phone, a smartphone, a personal digital assistant, a media player, a navigation device, an email sending/receiving device, a game console, a tablet computer, a wearable device, or any combination of these devices.

The implementations of the present specification are described in a progressive way. For same or similar parts of the implementations, mutual references can be made to the implementations. Each implementation focuses on a difference from other implementations. Particularly, a device implementation is similar to a method implementation, and therefore is described briefly. For a related part, references can be made to some descriptions in the method implementation. The previously described apparatus implementations are merely examples. The modules described as separate parts can or cannot be physically separate. During implementation of the solutions in the implementations of the present specification, functions of the modules can be implemented in one or more pieces of software and/or hardware. Some or all of the modules can be selected based on an actual demand to implement the objective of the solutions of the implementations. A person of ordinary skill in the art can understand and implement the implementations of the present specification without creative efforts.

The previous descriptions are merely specific implementations of the implementations of the present specification. It is worthwhile to note that a person of ordinary skill in the art can further make improvements or polishing without departing from the principle of the implementations of the present specification, and the improvements or polishing shall fall within the protection scope of the implementations of the present specification.

What is claimed is:

1. A computer-implemented method, comprising:
generating mapping relationships for a plurality of data records including performing, for each data record of the plurality of data records, operations comprising:

obtaining, by a data service provider that stores data by using a blockchain-type ledger, a service identifier and a service label of the data record, wherein the blockchain-type ledger includes multiple different data records having a same service identifier, wherein the service identifier is used to uniquely identify a service attribute of the data record, and the service label is used to represent a type of the data record;

establishing, by the data service provider, a mapping relationship among the service identifier, the service label, and location information that indicates a location of the data record in the blockchain-type ledger; and writing, by the data service provider, the mapping relationship into an index for which a primary key is the service identifier, and for which an index value includes respective mapping relationships for each data record in the blockchain-type ledger having the same service identifier;

receiving, by the data service provider from a client, a query that comprises a given service identifier and a given service label;

determining, by the data service provider, the location information for one or more data records represented in the index that match the given service identifier and the given service label;

obtaining, by the data service provider, the one or more data records from the blockchain-type ledger based on the location information; and providing, by the data service provider to the client, the one or more data records.

2. The computer-implemented method of claim 1, wherein the service label is used to classify data records having the same service identifier.

3. The computer-implemented method of claim 1, wherein the location information indicates (i) a block height of a data block that includes the data record, and (ii) a positional offset of the data record in the data block that includes the data record.

4. The computer-implemented method of claim 1, wherein obtaining the service identifier and the service label of the data record comprises:
in response to receiving a given data record from a user device, obtaining the service identifier and the service label from the given data record.

5. The computer-implemented method of claim 1, wherein obtaining the service identifier and the service label of the data record comprises:
determining data records included in an identified data block in the blockchain-type ledger; and
for each data record included in the identified data block, obtaining a respective service identifier and a respective service label of the data record.

6. The computer-implemented method of claim 1, wherein writing the mapping relationship into the index for which the primary key is the service identifier comprises:
in response to determining that the index does not include the service identifier, creating, in an index table, an index record in which the primary key is the service identifier; or
in response to determining that the index does include the service identifier, appending the location information to existing location information in the index record in which the primary key is the service identifier.

7. The computer-implemented method of claim 6, wherein appending the location information to existing location information in the index record in which the primary key is the service identifier comprises:
    determining timestamps of data records in the blockchain-type ledger, wherein a timestamp of a given data record indicates a time at which the given data record was written into the blockchain-type ledger; and
    writing location information of the data records in a same index record according to a sequence of the timestamps of the data records.

8. The computer-implemented method of claim 1, wherein determining the location information for the one or more data records represented in the index that match the given service identifier and the given service label comprises:
    obtaining one or more index values from the index that correspond to the given service identifier; and
    obtaining the location information from the one or more index values that match the given service label.

9. The computer-implemented method of claim 1, further comprising generating a data block, wherein generating the data block comprises:
    receiving data records to be stored;
    determining, for each data record of the data records to be stored, a respective hash value of the data record, wherein each data record comprises a respective service identifier and one or more service labels; and
    in response to a predetermined block generation condition being reached, determining data records to be written into the data block, and generating an Nth data block including a hash value of the data block and the data records.

10. A computer-implemented system, comprising:
    one or more computers; and
    one or more computer memory devices interoperably coupled with the one or more computers and having tangible, non-transitory, machine-readable media storing one or more instructions that, when executed by the one or more computers, cause the one or more computers to perform operations comprising:
        generating mapping relationships for a plurality of data records including performing, for each data record of the plurality of data records, operations comprising:
            obtaining, by a data service provider that stores data by using a blockchain-type ledger, a service identifier and a service label of the data record, wherein the blockchain-type ledger includes multiple different data records having a same service identifier, wherein the service identifier is used to uniquely identify a service attribute of the data record, and the service label is used to represent a type of the data record;
            establishing, by the data service provider, a mapping relationship among the service identifier, the service label, and location information that indicates a location of the data record in the blockchain-type ledger; and
            writing, by the data service provider, the mapping relationship into an index for which a primary key is the service identifier, and for which an index value includes respective mapping relationships for each data record in the blockchain-type ledger having the same service identifier;
        receiving, by the data service provider from a client, a query that comprises a given service identifier and a given service label;
        determining, by the data service provider, the location information for one or more data records represented in the index that match the given service identifier and the given service label;
        obtaining, by the data service provider, the one or more data records from the blockchain-type ledger based on the location information; and
        providing, by the data service provider to the client, the one or more data records.

11. The computer-implemented system of claim 10, wherein writing the mapping relationship into the index for which the primary key is the service identifier comprises:
    in response to determining that the index does not include the service identifier, creating, in an index table, an index record in which the primary key is the service identifier; or
    in response to determining that the index does include the service identifier, appending the location information to existing location information in the index record in which the primary key is the service identifier.

12. The computer-implemented system of claim 11, wherein appending the location information to existing location information in the index record in which the primary key is the service identifier comprises:
    determining timestamps of data records in the blockchain-type ledger, wherein a timestamp of a given data record indicates a time at which the given data record was written into the blockchain-type ledger; and
    writing location information of the data records in a same index record according to a sequence of the timestamps of the data records.

13. The computer-implemented system of claim 10, wherein determining the location information for the one or more data records represented in the index that match the given service identifier and the given service label comprises:
    obtaining one or more index values from the index that correspond to the given service identifier; and
    obtaining the location information from the one or more index values that match the given service label.

14. The computer-implemented system of claim 10, the operations further comprising generating a data block, wherein generating the data block comprises:
    receiving data records to be stored;
    determining, for each data record of the data records to be stored, a respective hash value of the data record, wherein each data record comprises a respective service identifier and one or more service labels; and
    in response to a predetermined block generation condition being reached, determining data records to be written into the data block, and generating an Nth data block including a hash value of the data block and the data records.

15. A non-transitory, computer-readable medium storing one or more instructions executable by a computer system to perform operations comprising:
    generating mapping relationships for a plurality of data records including performing, for each data record of the plurality of data records, operations comprising:
        obtaining, by a data service provider that stores data by using a blockchain-type ledger, a service identifier and a service label of the data record, wherein the blockchain-type ledger includes multiple different data records having a same service identifier, wherein the service identifier is used to uniquely identify a service attribute of the data record, and the service label is used to represent a type of the data record;

establishing, by the data service provider, a mapping relationship among the service identifier, the service label, and location information that indicates a location of the data record in the blockchain-type ledger; and writing, by the data service provider, the mapping relationship into an index for which a primary key is the service identifier, and for which an index value includes respective mapping relationships for each data record in the blockchain-type ledger having the same service identifier;

receiving, by the data service provider from a client, a query that comprises a given service identifier and a given service label;

determining, by the data service provider, the location information for one or more data records represented in the index that match the given service identifier and the given service label;

obtaining, by the data service provider, the one or more data records from the blockchain-type ledger based on the location information; and providing, by the data service provider to the client, the one or more data records.

16. The computer-readable medium of claim 15, wherein writing the mapping relationship into the index for which the primary key is the service identifier comprises:

in response to determining that the index does not include the service identifier, creating, in an index table, an index record in which the primary key is the service identifier; or in response to determining that the index does include the service identifier, appending the location information to existing location information in the index record in which the primary key is the service identifier.

17. The computer-readable medium of claim 16, wherein appending the location information to existing location information in the index record in which the primary key is the service identifier comprises:

determining timestamps of data records in the blockchain-type ledger, wherein a timestamp of a given data record indicates a time at which the given data record was written into the blockchain-type ledger; and writing location information of the data records in a same index record according to a sequence of the timestamps of the data records.

18. The computer-readable medium of claim 15, wherein determining the location information for the one or more data records represented in the index that match the given service identifier and the given service label comprises:

obtaining one or more index values from the index that correspond to the given service identifier; and obtaining the location information from the one or more index values that match the given service label.

19. The computer-readable medium of claim 15, the operations further comprising generating a data block, wherein generating the data block comprises:

receiving data records to be stored;

determining, for each data record of the data records to be stored, a respective hash value of the data record, wherein each data record comprises a respective service identifier and one or more service labels; and in response to a predetermined block generation condition being reached, determining data records to be written into the data block, and generating an Nth data block including a hash value of the data block and the data records.

* * * * *